Figure 1:
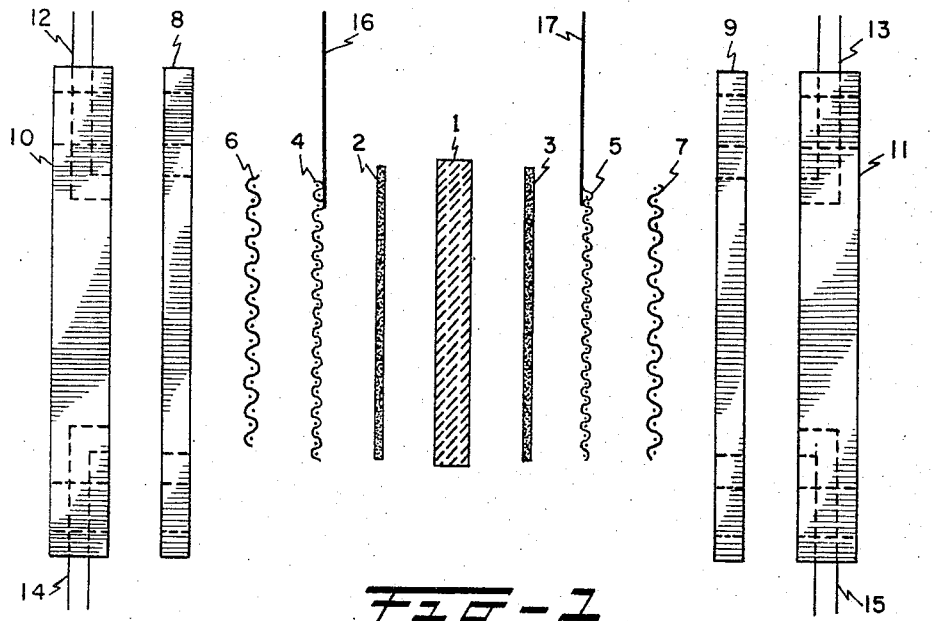

Oct. 24, 1967     L. K. ZIERING     3,348,975
PROCESS FOR PREPARING FUEL CELL ELECTRODE CONTAINING
45% OF A WATER-PROOFING AGENT
Filed Aug. 26, 1964

INVENTOR.
LANCE KENNETH ZIERING
BY Harry H. Kline
ATTORNEY 3,348,975
PROCESS FOR PREPARING FUEL CELL ELECTRODE CONTAINING 45% OF A WATERPROOFING AGENT
Lance Kenneth Ziering, Stamford, Conn., assignor to American Cyanamid Company, Stamford, Conn., a corporation of Maine
Filed Aug. 26, 1964, Ser. No. 392,116
6 Claims. (Cl. 136—120)

The present invention relates to a novel fuel cell electrode and to methods for its manufacture. More particularly, it relates to a fuel cell electrode having at least about 45% of a water-proofing agent contained therein. Still more particularly, the invention is concerned with the spray coating of a catalytic composition upon a metallic screen substrate to prepare an electrode suitable for use in a variety of fuel cells as, for instance, a hydrazine-air, a hydrogen-oxygen, or a propane-air fuel cell.

It is known that electrodes comprising a catalyst have been prepared, for instance, by spreading a typical platinum catalyst composition over a metallic screen substrate and passing the latter through rollers to imbed the catalyst composition into the screen. Unfortunately, nonuniformity or loading of catalyst composition as well as poor reproducibility of results when utilizing such electrodes are at best attained. Further, the mechanical stability of such electrodes is found to be unsatisfactory. Rapid disintegration is also observed after operating within a relatively short period of time due to the erosion of catalyst in the electrode at high gas velocities normally employed in operating a gas fuel cell.

A second method for the preparation of electrodes suitable for use in a fuel cell involves the molding of a composition containing catalyst, water-proofing binder and a substrate at elevated temperatures and pressures. In the presence of catalyst, electrodes prepared from a molding operation unfortunately have serious limitations in that use of elevated temperature and pressure can deactivate the catalyst and cause the electrode to function poorly. Further, utilizing such molding procedure, reproducibility of results is generally not common. In a typical molding procedure, not more than 40%, and preferably from 15% to 20%, of the water-proofing binder can be used in preparing the composition for molding an electrode whose size is necessarily limited by the mold.

A third method for preparing electrodes for use in a fuel cell contemplates a spray coating technique as disclosed in British Patent No. 941,595. However, this technique is of limited application in that it involves the preparation of a porous carbon electrode in which catalyst is noticeably absent. Patentee discloses that a mixture comprising carbon and a binder is sprayed on a metallic substrate. The composition is then sintered at elevated temperatures, thereby allegedly eliminating the costly gasification techniques employed in the art when preparing electrodes from sintered metal powders. Nonetheless, the process of the British patent is inoperative in preparing electrodes containing a catalyst since deactivation of the resultant electrode occurs and is, therefore, not useable.

A principle object of the present invention is to provide a catalyst-containing electrode which obviates the aforementioned difficulties in the art. It is a further object of the invention to provide an electrode of enhanced mechanical stability. A still further object is to provide an electrode having acceptable reproducibility with respect to both catalytic loading and electrochemical results. A still further object is to provide an electrode having a waterproofing content sufficient to accommodate excess water formation so that stable voltages at high current densities are obtained. These and other advantages will become apparent from a consideration of the ensuing description.

To this end it has been unexpectedly found that a spray coating procedure results in a novel electrode having a water-proofing content hitherto unattained. Surprisingly, uniform, mechanically strong electrodes capable of electrochemical reproducibility and having a suitably high water-proofing content of at least 45%, based on the overall total solids of the electrode, are readily obtained.

According to the process of the invention, a novel electrode is formed by initially preparing a mixture comprising an aqueous suspension of a catalyst, a water repellent compound and a water soluble extender in the presence or absence of a conductive filler. Typically, the latter mixture which has the consistency of a latex paint is next sprayed on a metallic screen at room temperature. Any excess sprayed composition or mixture is collected in a suitable vessel. Such excess can, if desired, be reused in the preparation of additional mixture. The so-coated metallic screen is passed over a heating zone to effect the removal of the water from the coated substrate. Usually, the temperature of the zone is maintained at a temperature between about 50° C. and 100° C.

Dried substrate is next spray coated with mineral oil to provide a lubricant for the substrate surface. However, this step can, if desired, be omitted, provided a conductive filler is employed in the initial preparation of the catalyst mixture. Graphite, for instance, can function both as lubricant and as the conductive filler.

The lubricated, mechanically weak electrode is then calendered by passing the electrode through rollers which usually are coated with Mylar or polyethylene. Alternatively, the rollers may also be fabricated from polished stainless steel. The pressure maintained between rollers ranges from about 200 to about 1000 pounds per linear inch and their speed is maintained between about 0.5 and 10 feet per minute. In the calendering operation, the catalyst mixture is imbedded in the metallic screen. If desired, a cover sheet of Mylar or polyethylene can be employed by adding the latter to the electrode immediately prior to its introduction through the rollers. In a final step, stripping of the cover sheet results in the formation of a mechanically strong electrode.

The sheet so treated is next activated by removing all foreign substances introduced during the preparation of the electrode. These are, for instance, carboxymethyl cellulose or mineral oil. Any alkaline substance, such as potassium hydroxide or sodium bicarbonate, is employed to remove carboxymethyl cellulose and the so-treated electrode is finally rinsed with water. Where mineral oil had been sprayed on the electrode, the oil is extracted with a hydrocarbon, such as hexane or heptane, rinsed with alcohol and finally, treated with water. The so-activated electrode is next cut to desired size for use in a fuel cell.

In preparing the initial catalyst mixture, any of a variety of catalysts ranging from about 1% to 50% is present. Illustratively, platinum, palladium, ruthenium, nickel or silver can be utilized. Appropriate metal can be deposited on carbon, for instance, by reducing the metal in the form of its acid such as, for example, by the sodium borohydride reduction of chloroplatinic acid to platinum.

In general, any water repellent compound can be employed along with the catalyst to form the spray composition of the invention. For instance, polyfluoroethylene or polyethylene latex emulsions ranging in amounts from about 45% to about 75%, based on the overall weight of the electrode solids, can advantageously be added to the mixture prior to the spray coating step. For certain operations, it may be desirable to provide a lower percentage of water-proofing compound. In this event, the polyfluoroethylene (Teflon) emulsion in amounts as low as 10% can be tolerated.

An electrically conductive filler in small amounts can be added to the original mixture prior to spray coating.

Illustrative fillers are: lamp black, graphitic carbon, titanium, tellurium or nickel powders. Usually, from about 1% to not more than about 10% of the conductive filler is incorporated along with catalyst and water-proofing agent. This is to provide a lubricant for the resultant spray-coating mixture.

To prepare the sprayable catalyst mixture of the present invention, it is of critical import to provide a water soluble extender in amounts between about 1% and 10% based on the weight of the overall electrode solids. Exemplary extenders are: carboxymethyl cellulose, hydroxyethyl cellulose, polyethylene glycols and methoxy-polyethylene glycols.

In a typical run, the following specific procedure is utilized. A composition containing a mixture of 100 parts of platnium black, 100 parts of polyfluoroethylene as a 60% dispersion, 100 parts of a 6% carboxymethyl cellulose solution and 150 parts of water is admixed in a suitable vessel and then introduced to a mechanical spray assembly. The Teflon and carboxymethyl cellulose are present in the mixture based on a volume calculation. The thoroughly admixed composition is next sprayed on a nickel wire cloth screen of about 4 mils in thickness and a mesh size of about 100. Alternatively, any suitable screen cloth which is not corrosive in the environment of the fuel cell may be used including platinum, tantalum as well as plastic screens, such as polyfluoroethylene.

Advantageously, excess composition which passes through the screen during spray coating is collected in a suitable vessel and ultimately recycled to the initial mixture for reuse. The coated electrode is dried, as for instance, by applying hot air thereto at a temperature from about 85° C. to about 90° C. Water is thereby removed and a light application of mineral oil is applied to the surface of the electrode. This is accomplished by spraying the mineral oil directly on either one or both sides of the electrode. Where graphite is initially added to the mixture prior to spray coating of the metallic screen, the light application of the mineral oil may be omitted. At this point, the electrode is structurally weak.

The lubricated electrode is subjected to a calendering operation at a pressure ranging between 5000 and 15,000 pounds per square inch while passing through polished stainless steel rollers at a linear speed of 5 feet per minute. The so-calendered, now structurally strong electrode, is next activated by the removal therefrom of the water soluble carboxymethyl cellulose extender and the mineral oil lubricant. Activation is next accomplished by passing the treated electrode into a 1 N potassium hydroxide solution to remove carboxymethyl cellulose, and thereafter water-rinsing so as to remove excess potassium hydroxide. Heptane removes mineral oil followed by an ethanol extraction to remove residual heptane. Finally, water is introduced to remove the alcohol. The activated electrode is next cut to the desired shape and size and is ready for use in a fuel cell.

Figure 2:
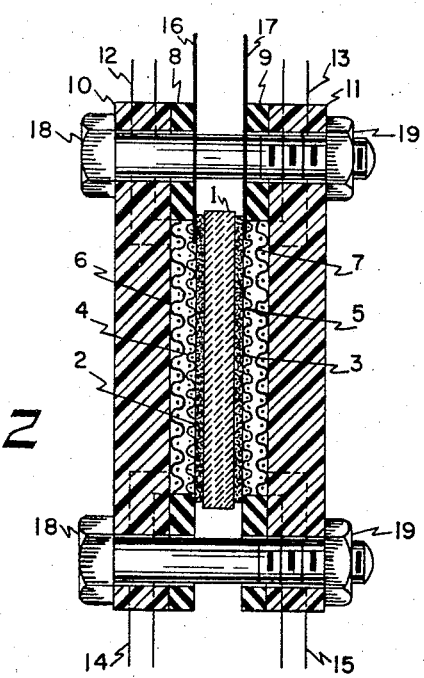

In order to clarify the invention utilizing the above-formed electrode, the accompanying drawing defines one embodiment of such utilization. In the drawing:

FIG. 1 is an exploded plan view partially in section of a fuel cell employing the water-proofed electrode fabricated according to the present invention, and FIG. 2 is a partially expanded side view, partially in section of the fuel cell of FIG. 1.

In FIG. 1, an asbestos paper matrix saturated on 5 N potassium hydroxide is positioned between electrodes 2 and 3 as prepared above. Abutting the latter electrodes are current collector screens 4 and 5 which comprise stainless steel or other suitable inert metal. Stainless steel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as silicone rubber. These seal as well as separate the chambers containing reactants. Exterior to the gaskets are housing members 10 and 11 having inlet stainless steel or other inert metal tubing 12 and 13 through which hydrogen and oxygen are separately introduced into the fuel cell. Stainless steel tubing 14 and 15 are provided as vents for unused gases. Wire leads 16 and 17 connected onto current collector screens 4 and 5 are the conductive members through which current flows from and to the fuel cell via the external circuit when the cell is in operation. The cell is secured by means of bolts 18 and nuts 19 as shown in FIG. 2.

It is found that where the electrode prepared as defined above with a platinum loading equal to 7.4 mg./cm.$^2$, the voltages at 0, 20, 40, 100 and 200 ma./cm.$^2$ are 1.050, 0.945, 0.917, 0.867 and 0.805 volt, respectively.

Advantageously, the process of the present invention is applicable to both batch and continuous operations to obtain electrodes on enhanced structural strength. Ready control in the coating of a catalyst mixture upon a screen and a high level of reproducibility in electrochemical results are attainable in particular by the practice of the present invention.

I claim:
1. In the preparation of an electrode adapted for use in a fuel cell, the improvement which comprises the sequential steps of:
   (a) spray coating on a screen substrate an aqueous catalyst mixture comprising a catalyst, water-proofing agent and a water soluble extender whereby a structurally weak composite is formed;
   (b) drying the later composite to remove water therefrom at a temperature between about 50° C. and 100° C.;
   (c) spray coating mineral oil lubricant on said dried composite;
   (d) calendering said lubricated composite to provide good structural strength to said composite; and
   (e) activating the so-calendered composite by the removal therefrom of the water soluble extender and the said mineral oil.

2. A process according to claim 1 in which the water-proofing agent is present to the extent between about 45% and 75%, based on the weight of the overall solids content of the composite.

3. A process according to claim 1 in which the catalyst is platinum.

4. A process according to claim 1 in which the catalyst is palladium.

5. A process according to claim 1 in which the catalyst is ruthenium.

6. A process according to claim 1 in which the step of calendering is carried out at a pressure between about 5000 and 15,000 pounds per square inch and at a speed of about 5 feet per minute.

References Cited

UNITED STATES PATENTS

| | | | |
|---|---|---|---|
| 3,252,839 | 5/1966 | Langer et al. | 136—121 |
| 2,805,274 | 9/1957 | Eisen | 136—120 |
| 3,097,974 | 7/1963 | McEvody et al. | 136—120 |
| 3,121,029 | 2/1964 | Duddy | 136—120 |
| 3,125,468 | 3/1964 | Thompson et al. | 136—86 |

FOREIGN PATENTS 938,708  10/1963  Great Britain.

WINSTON A. DOUGLAS, *Primary Examiner.*

A. SKAPARS, *Assistant Examiner.*